US006841765B2

(12) United States Patent
Back et al.

(10) Patent No.: US 6,841,765 B2
(45) Date of Patent: Jan. 11, 2005

(54) MICROWAVE OVEN INCORPORATING A TOASTER

(75) Inventors: Yoon Gun Back, Changwon-shi (KR); Sang Jin Oh, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 10/292,632

(22) Filed: Nov. 13, 2002

(65) Prior Publication Data

US 2003/0132225 A1 Jul. 17, 2003

(30) Foreign Application Priority Data

Jan. 14, 2002 (KR) .......................................... 2002-2133
Jan. 14, 2002 (KR) .......................................... 2002-2135

(51) Int. Cl.⁷ ................................................ H05B 6/80
(52) U.S. Cl. ....................... 219/685; 219/739; 219/756; 219/762; 99/451
(58) Field of Search ................................ 219/685, 680, 219/725, 739, 756, 762, 763, 386, 521, 413; 99/385, 391, 392, 393, 400, 402, 451, DIG. 14

(56) References Cited

U.S. PATENT DOCUMENTS 3,660,637 A  *  5/1972  Grove .......................... 219/413
6,539,840 B2  *  4/2003  Choi et al. ..................... 99/331
2002/0070212 A1  *  6/2002  Choi et al. .................... 219/680

FOREIGN PATENT DOCUMENTS

| EP | 1213948 | 6/2002 |
|---|---|---|
| JP | 2004131 | 1/1990 |
| JP | 3271630 | 12/1991 |
| JP | 4061832 | 2/1992 |
| JP | 4061833 | 2/1992 |

* cited by examiner

Primary Examiner—Philip H. Leung
(74) Attorney, Agent, or Firm—McKenna Long & Aldridge LLP

(57) ABSTRACT

A microwave oven incorporating toaster includes a tray provided on a tray support. The tray support moves forward and backward in inside the toaster. The tray support includes a bushing for moving within moving slots provided at both sidewalls of a toaster case. A connecting lever connects the bushing to a toaster door and translates a motion generated by operation of the toaster door when it opens and closes into a moving motion exhibited by the tray. A food item (e.g., a slice of bread, bagel, etc.) arranged on the tray may be inserted into, or removed from, the inside of the toaster by operating the toaster door.

28 Claims, 8 Drawing Sheets

MICROWAVE OVEN INCORPORATING A TOASTER

This application claims the benefit of the Korean Application No. 10-2002-002133 filed on Jan. 14, 2002 and 10-2002-002135 filed on Jan. 14, 2002, which are hereby incorporated by reference as if fully set forth herein.

BACKGROUND OF THE INVENTION

1. Field of the Invention

The present invention relates to a microwave oven, and more particularly, to a microwave oven incorporating a toaster.

2. Discussion of the Related Art

Generally, microwave ovens such as those illustrated in FIG. 1, heat objects (e.g., food) by applying microwaves to them. Referring to FIG. 1, microwave ovens include a cavity 2, in which an object may be heated by microwaves. The cavity 2 is formed in an interior of a cavity assembly 1 and may be opened and closed via a cavity door 4. Microwaves may be generated by various electrical devices accommodated with an electrical device chamber 10 provided near the cavity 2. The electrical device chamber may be covered with an outer case 6. The various electrical devices may include, for example, a magnetron 12 for generating microwaves, a high-voltage transformer 14 for supplying high voltage to the magnetron 12, and a fan 16 for generating an air flow inside the cavity 2 thereby cooling the various electrical devices as they may become heated.

While conventional microwave ovens heat objects using microwaves, microwaves cannot be used to toast food (e.g., slices of bread, bagels, etc.). Therefore, microwave ovens capable of toasting food as well as heating an object using microwaves have become desirable. In such microwave ovens including a toaster, each food item (e.g., slice of bread, bagel, etc.) must be positioned proximate a heater within the toaster such that the toasting performance is maximized.

However, after toasting is complete, inner temperatures of the toaster tend to be high, making it difficult to safely draw out the toasted food item from the toaster. For example, drawing out a toasted food item from the toaster using bare hands becomes complicated and dangerous due to the narrow toaster entrance and the high temperature inside the toaster.

Accordingly, the principles of the present invention provide a microwave oven incorporating a toaster that is safe and convenient to use.

SUMMARY OF THE INVENTION

Accordingly, the present invention is directed to a microwave oven incorporating a toaster that substantially obviates one or more problems due to limitations and disadvantages of the related art.

An advantage of the present invention provides a microwave oven incorporating a toaster, in which a food item (e.g., slice of bread, bagel, etc.) may easily be taken out from inside the toaster after toasting.

Another advantage of the present invention provides a microwave oven incorporating a toaster, in which a toaster door may be stably opened and closed.

Another advantage of the present invention provides a microwave oven incorporating a toaster having a toaster door that may be prevented from being damaged by heat while preventing a user from being burnt by the heat.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a microwave oven incorporating a toaster includes a tray for supporting a food item, an electrical device chamber having various electrical devices for heating food items arranged on the tray, and a toaster within the electrical device chamber, wherein a food item may be inserted into or removed from a toaster case by opening or closing a toaster entrance.

In one aspect of the present invention, the toaster may include a toaster door for opening or closing the toaster entrance and a tray connected to the toaster door by a link mechanism. Accordingly, the tray may be inserted into or removed from the toaster by closing or opening, respectively, the toaster door.

The toaster door rotates about an axis formed at a bottom portion of the toaster door. The center of gravity of the toaster door may be located in an upper portion of the toaster door.

The toaster door may be provided a thermally insulating structure for preventing heat within the toaster from flowing outside the toaster door and preventing an exterior of the toaster door from being deformed. In one aspect of the present invention, the toaster door may be provided as an exterior door panel, a door frame, made of a heat-resistant material, arranged at a rear portion of the door panel for covering the toaster entrance, and a door protector arranged at the rear of the door panel and adjacent the door frame for blocking heat flowing from the door frame to the door panel.

In one aspect of the present invention, a flange may be provided at a rear end of the tray to support the backside of a food item placed on the tray.

In another aspect of the present invention, the link mechanism may include a tray support coupled to a lower portion of the tray, wherein the tray support reciprocates within a toaster case, and a connecting lever for coupling the toaster door to the tray support.

According to the present aspect, the tray support may move along slots arranged within sidewalls at a bottom portion of the toaster case. The slots may be oriented in a direction parallel with the tray. A bushing inserted within the slot and fixed to each of the sides of the tray support may guide the reciprocating movement of the tray support.

Further according to the present aspect, the connecting lever may include a first end and a second end. The first end may be rotatably coupled to the bushing. The second end may be rotatably coupled to the toaster door at a predetermined position. The predetermined position may correspond to a position between a pivot line and the center of gravity of the toaster door. For example, the second end of the connecting lever may be positioned from the pivot line to a height ⅓ the total height of the toaster door.

In still another aspect of the present invention, the link mechanism may include an elastic member for connecting the connecting lever to the toaster case. Accordingly, the elastic member may facilitate the closing of the toaster door. For example, the elastic member may connect the second end of the connecting lever to a rear end of the toaster case.

In one aspect of the present invention, as the toaster door rotates towards a threshold rotational angle, a rotational moment of the toaster door becomes larger than a restoring force induced by the elastic member. Accordingly, if the toaster door is opened or closed, the toaster door remains opened or closed until the user manipulates the toaster door by rotating it towards the threshold rotational angle, for example, about 80 degrees from the front of the toaster.

In a microwave oven incorporating a toaster according to the present invention, food items may be easily and safely drawn out from within the toaster after, for example, they have been toasted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
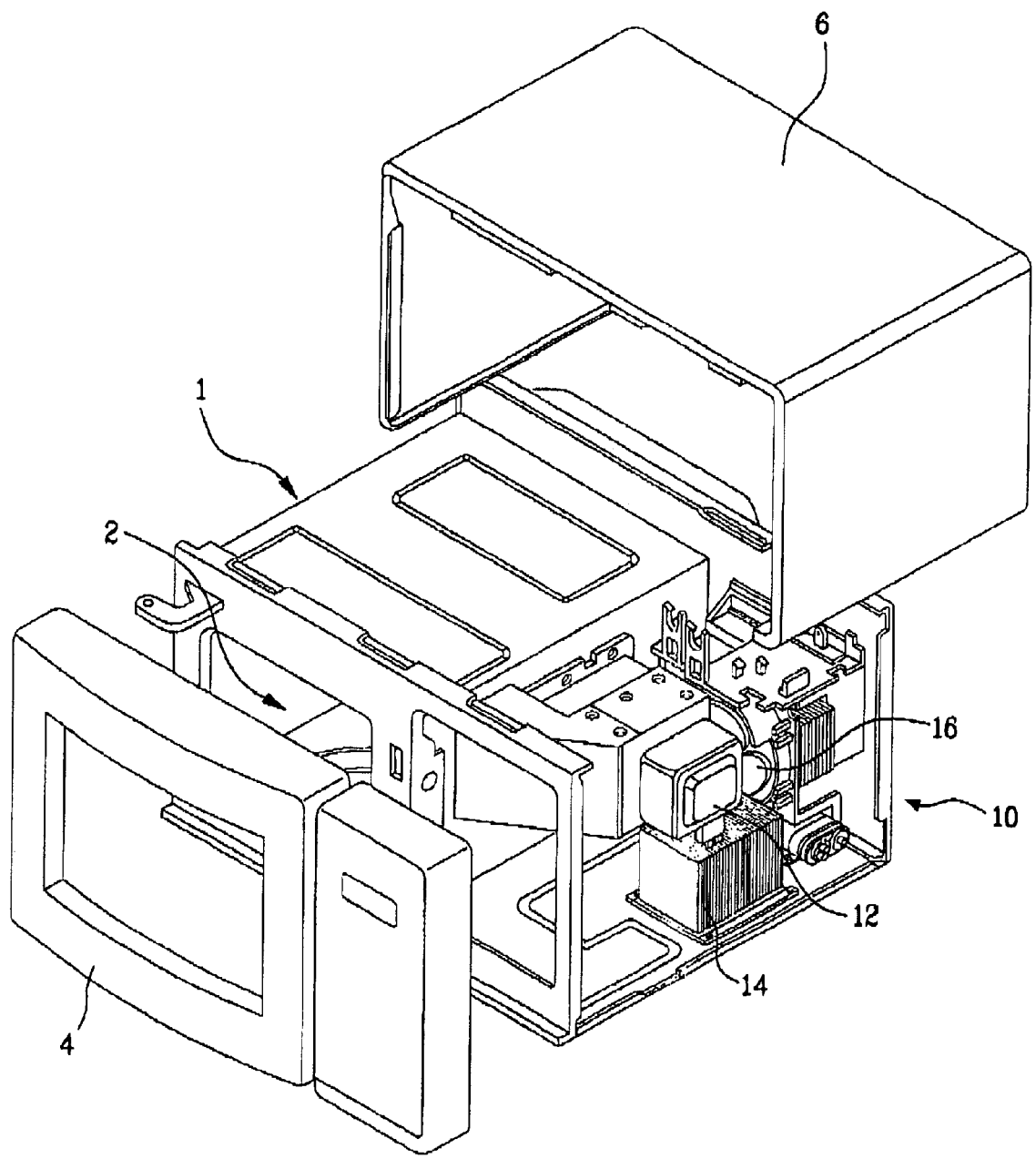
FIG. 1 illustrates an exploded perspective view of a related art microwave oven.
Figure 2:
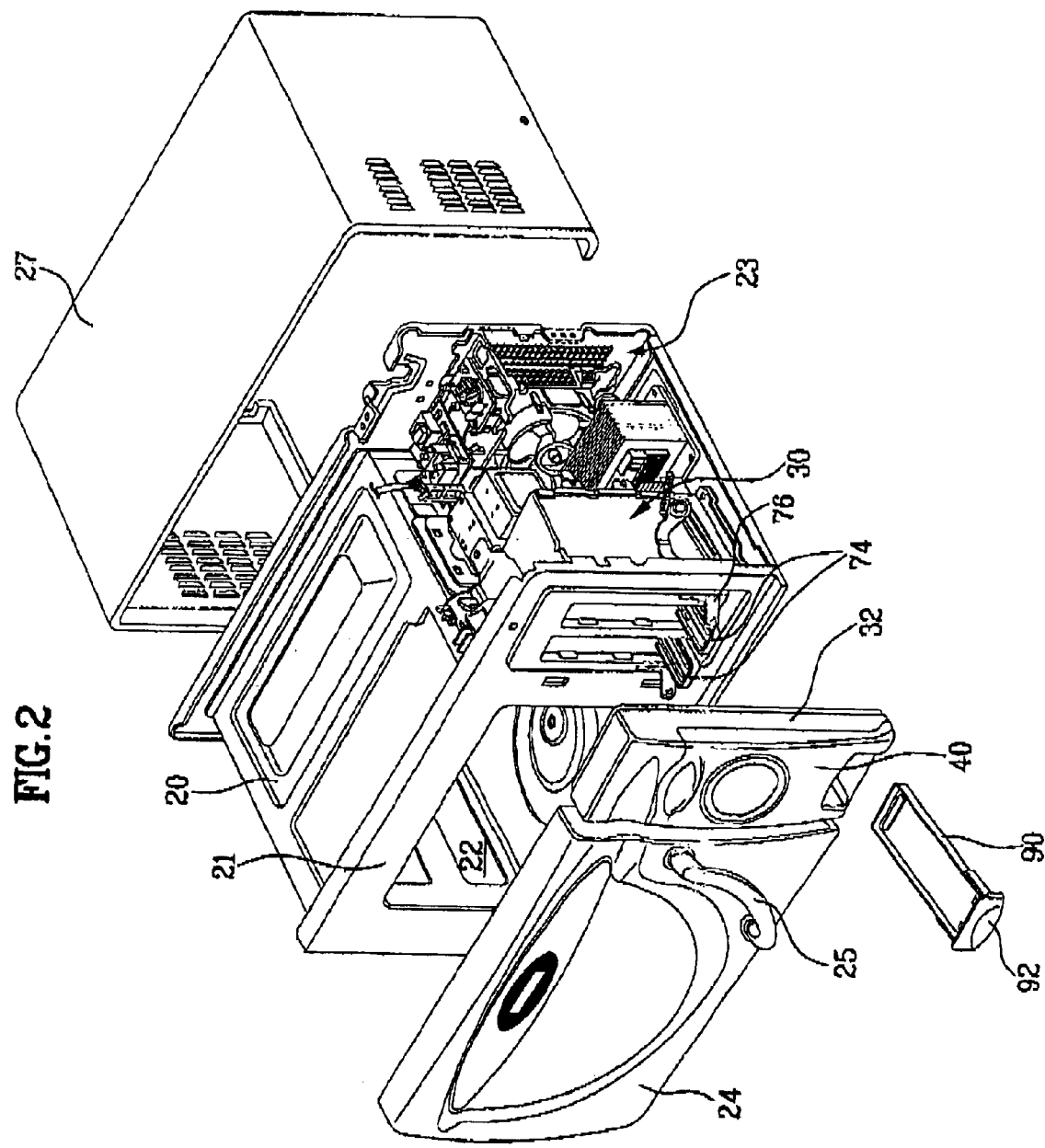
FIG. 2 illustrates a perspective view of a microwave oven incorporating a toaster in accordance with the principles of the present invention.

FIG. 2 illustrates an exploded perspective view of a microwave oven incorporating a toaster according to the present invention.

Referring to FIG. 2, a cavity 22 is arranged within cavity assembly 20 and an electrical device chamber 23 is arranged adjacent the cavity 22. An object (e.g., food) arranged within the cavity 22 may be heated by microwaves generated by various electrical devices arranged within the electrical device chamber 23.

The cavity 22 may be opened and closed via a cavity door 24. The cavity 22 may be closed when the cavity door 24 contacts a front plate 21. A user may open and close the cavity door 24 using a door handle 25 included within the cavity door 24.

An outer case 27 may cover the cavity assembly 20 and the electrical device chamber 23, thereby forming top and side exterior surfaces of the microwave oven. A toaster 30 may be arranged in front of the electrical devices within the electrical device chamber 23. The toaster 30 may be installed in such a way that it penetrates the front plate 21. A toaster panel 32 comprising an exterior surface material may be provided in front of the toaster 30. In one aspect of the present invention, the exterior surface material of the toaster panel 32 may be the same as that of the cavity door 24, such that a smooth surface may be formed on the front surface of the microwave oven between the toaster panel 32 and the cavity door 24.

Figure 3:
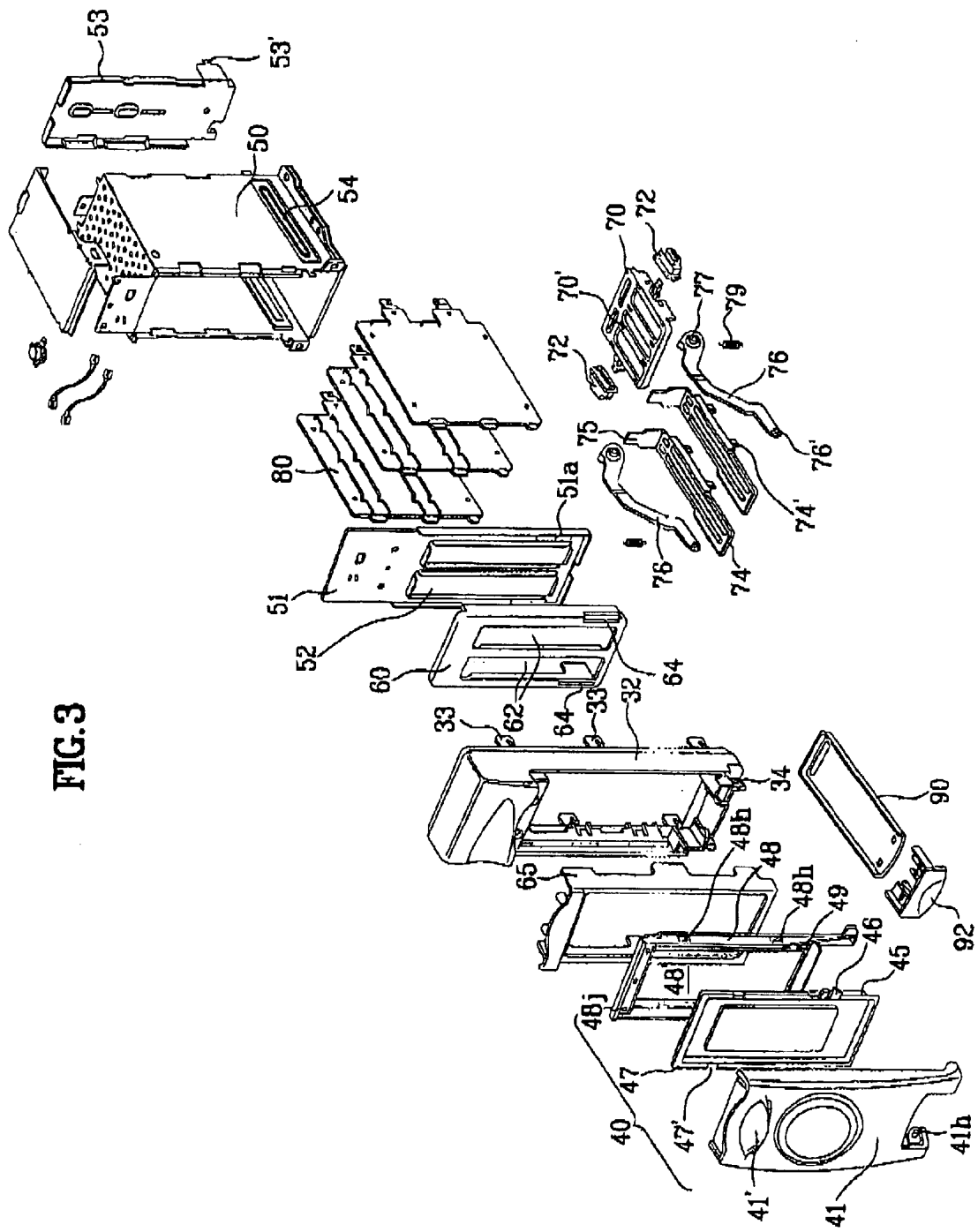
FIG. 3 illustrates an exploded perspective view of the toaster incorporated within the microwave oven shown in FIG. 2.

FIG. 3 illustrates an exploded perspective view of the toaster 30 included within the microwave oven shown in FIG. 2.

Referring to FIG. 3, the rear of the toaster panel 32 may be provided with a plurality of fixing means 33 (e.g., hooks, screws, adhesive, and the like) such that the toaster panel 32 may be fixed to the front plate 21 (shown in FIG. 2) by the fixing means 33.

The toaster 30 further includes a toaster door 40 rotatably coupled to the toaster panel 32 by a hinge assembly. The toaster door 40 may be formed so as to prevent heat generated by the toaster to flow outside the toaster when the toaster door is in a closed position (e.g., when the toaster entrances 62 are concealed by the toaster door 40, as will be discussed in greater detail below). Accordingly, the toaster door 40 includes a door panel 41, a door frame 45, and a door protector 48 provided at the back of the door panel 41 (shown in FIGS. 3 and 4).

The door panel 41 forms the exterior surface of the toaster door 40 and allows the toaster door 40 to be rotatably coupled to the toaster 30. To this end, the door panel 41 includes hinge pins 41h and the toaster panel 32 includes hinge holes 34. In one aspect of the present invention, the hinge pins 41h and hinge holes 34 may be provided at a bottom portion of the door panel 41. Accordingly, the toaster door 40 may be rotated about an axis created by the hinge pins 41h and hinge holes 34. In one aspect of the present invention, the exterior surface material of the door panel 41 may be the same as that of the toaster panel 32, such that a smooth surface may be formed on the front surface of the microwave oven between the door panel 41, the cavity door 24 and the toaster panel 32. The door panel 41 further includes a toaster door handle 41' allowing a user to open and close the toaster door 40.

Figure 4:
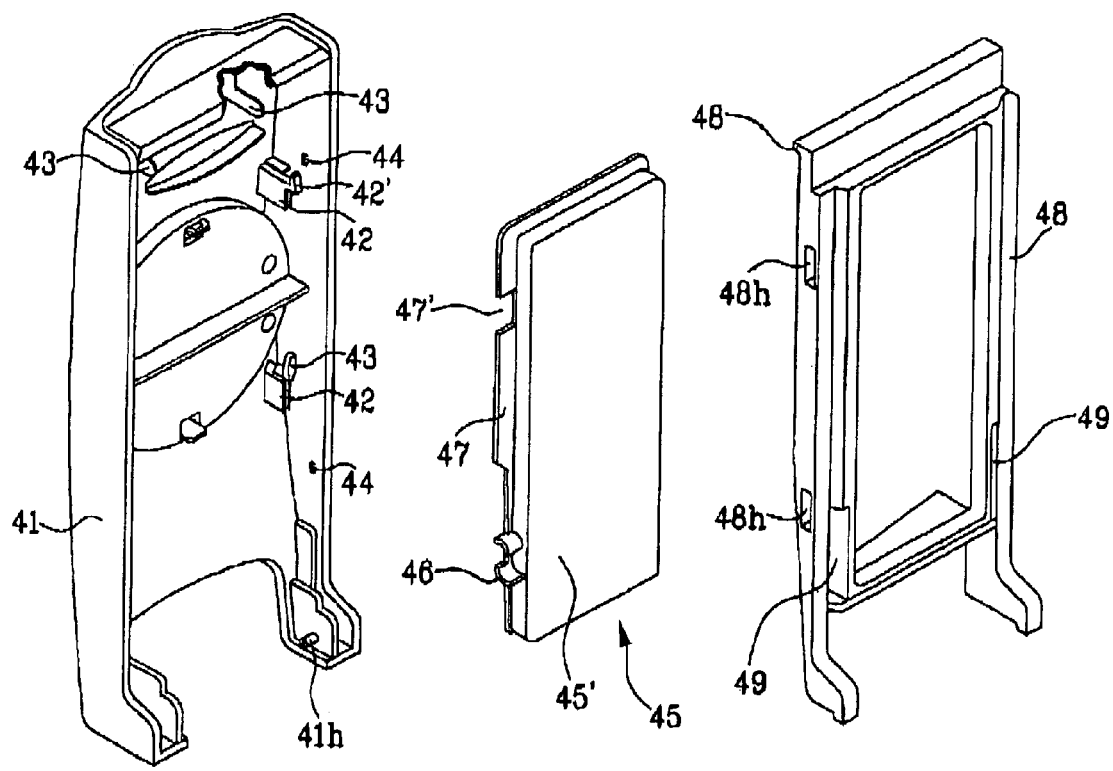
FIG. 4 illustrates an exploded perspective view of a toaster door included within the microwave oven shown in FIG. 2.

Referring now to FIG. 4, a rear surface of the door panel 41 may be configured in such a way that the door frame 45 and door protector 48 may be secured to each other. Accordingly, supports 42 projecting from at least four portions at the back of the door panel 41 may be provided so as to support the door frame 45. Further, hooks 42' may be arranged on one end of each of the supports 42. Still further, inserting guides 43 projecting a predetermined distance from an upper portion of the back of the door panel 41 may be formed so as to be secured to step portions 48j arranged on the door protector 48 shown in FIG. 3.

Projections 44 may be formed on a side surface at the rear of the door panel 41. One surface of the projections 44 opposite the back of the door panel 41 may be formed in a plane, and the other surface is formed as an incline.

The door frame 45 may be arranged at the back of the door panel 41. The door frame may be made out of a material that does not substantially deform when heated to temperatures experienced in a toaster, such as a metal. In use, a frame surface 45' projecting from an edge 47 of the door frame 45 may contact a toaster front 60 and substantially cover a toaster entrance 62, as will be described in greater detail below.

When the door frame 45 is seated on the supports 42, an insulating space is defined by the frame surface 45', the back of the door panel 41, and sidewalls found between the edge 47 and the frame surface 45'. Air found within the insulating space insulates the door panel 41 heat generated within the toaster. Cut-away part 47', formed by selectively removing a portion of edge 47, corresponds in location to hook 42' arranged on support 42. In one aspect of the present invention, cut-away part 47' may be formed larger in size than hook 42' to facilitate assembling, as will be described in greater detail below.

Door protector 48, formed of insulating material, may be secured to the door panel 41. In securing door protector 48 to the door panel 41, door frame 45 may also be secured to the door panel 41. A hole 48', in which door frame 45 is arranged, may be provided through door protector 48 to allow frame surface 45' to be exposed and thereby contact the toaster front 60 when the toaster door 40 is closed. Grooves 48h, corresponding to projection 44, may be formed at one portion of the side surface of door protector 48. Step portion 48j may be formed at an upper portion of the door protector 48 toward the door panel 41.

Referring back to FIG. 3, toaster 30 also includes a toaster case 50 provided behind toaster panel 32. Toaster case 50 may be coupled with the toaster panel 32 through a portion of front plate 21 corresponding to the front side of the electrical device chamber 23. Toaster case 50 may, for example, be made of metal material and provide a space for toasting a food item (e.g., a slice of bread, bagel, etc.).

The case front plate 51 provided at the front of the toaster case 50 includes two case entrances 52 through which food items may pass upon their insertion into and removal from the interior of the toaster case 50. Two spring hooks 53' may be provided at the bottom of a rear case plate 53 provided at the back of the toaster case 50. Each of the spring hooks 53' may be connected to one end of an elastic member 79 for purposes that will be discussed in greater detail below.

A toaster front 60 made of metal material may be arranged at the front of the case front plate 51 and within the toaster panel 32. The toaster front 60 includes two rectangular toaster entrances 62 that may be selectively exposed or concealed when the toaster door 40 or closed, respectively. Each of the toaster entrances 62 may be coupled to respective ones of the case entrances 52.

A protector 65, made of an insulating material, may be provided between the toaster front 60 and the toaster panel 32. Accordingly, the protector 65 prevents heat generated within the toaster from flowing from the toaster front 60 to the toaster panel 32.

The toaster 30 may include at least one tray 74 positioned within the toaster case 50. The tray 74 supports the food item, for example, while the food item is heated. In one aspect of the present invention, the tray 74 may support a food item arranged vertically thereon (i.e., an orientation wherein a major surface of the food item is arranged vertically over the tray 74). While FIG. 3 illustrates two trays 74, a plurality of trays may be provided as required.

The toaster 30 further includes a plurality of heaters 80 formed within the toaster case 50. The heaters 80 are capable of generating heat sufficient to toast a food item (e.g., slice of bread, etc.). Each of the heaters comprise a plurality of heating elements (e.g., heat-generating wires wound about a support plate, not shown). The heaters may be positioned at portions corresponding to sides of food items and provide heat to the both sides food items arranged within the toaster 30.

A crumb holder 90 may be arranged at the bottom of the toaster case 50 through the lower part of the toaster panel 32. The front of the crumb holder 90 comprises a holder handle 92 provided between the hinge pins 42. In practice, a user may pull the holder handle 92 to draw out the crumb holder 90, empty the crumb holder 90, and push the holder handle 92 back thereby placing the crumb holder 90 at the bottom of the toaster case 50. In one aspect of the present invention, holder handle 92 may include a surface material that is the same as that of the door panel 41.

In one aspect of the present invention, tray 74 may be inserted into, and removed from, the interior of the toaster 30. Accordingly, a food item arranged on the tray 74 may be inserted and removed from the toaster 30. In one aspect of the present invention, tray 74 may be moved by manipulating the toaster door 40. For example, a link mechanism may be provided so as to couple to the toaster door 40 to the tray 74.

Accordingly, the link mechanism may include a connecting lever 76, made of metal material, connecting the toaster door 40 to a tray support 70. The tray support 70 may be reciprocally moveable within the toaster case 50.

Still referring to FIG. 3, a plurality of fastening slits 70' may be arranged within a flat area of the tray support 70 and a plurality of fastening hooks 74' may be provided at the bottom of the tray 74. The fastening slits 70' accommodate respective ones of the plurality of fastening hooks 74' such that the tray 74 may be securely arranged on the tray support 70. In one aspect of the present invention, when the tray 74 is securely arranged on the tray support 70, the tray 74 may be moved as the tray support 70 moves.

In one aspect of the present invention, the tray support 70 stably moves along directions dictated by a pair of moving slots 54 provided within sidewalls of the toaster case 50 and oriented along a direction parallel to the bottom edge of the toaster case sidewalls. The tray support 70 may include two connecting parts 71 provided on left and right sides of the tray support 70. Bushing 72 may be provided at ends of each connecting parts 71 and inserted into a respective one of a moving slots 54. In one aspect of the present invention, each bushing 72 supports the tray support 70 and has a shape allowing it to move within the moving slot 54 while preventing the tray support 70 from rotating while the bushing 72 is moving. For example, a portion of bushing 72 that is to be inserted into the moving slot 54 has a hexahedron-shape. By preventing the tray support 70 from rotating, the trays 74 may always be kept parallel to the orientation of the moving slots 54.

In one aspect of the present invention, the tray support 70 may be the same width as a frontal width of the toaster case 50. Accordingly, when the tray support 70 moves forward, toward the case front plate 51, the tray support 70 may be locked to a lower portion of a case front plate 51 such that the tray support 70 does not project out from the case front plate 51. When the toaster door 40 is completely opened, however, a predetermined portion of each tray 74 may be projected out from each toaster entrances 52 and 62.

A first end of the connecting lever 76 may be rotatably coupled to the bushing 72 while a second end of the connecting lever 76 may be rotatably coupled to the toaster door 40. Lever slots 64, 51a, and 49 may be formed at the bottom of the toaster front 60, case front plate 51, and door protector 48, respectively. The connecting lever 76 may, therefore, mechanically couple bushing 72 to the door 40 by passing through lever slots 64, 51a, and 49. Additionally, connecting lever 76 moves within the lever slots 64 and 51a to move the tray support 70 in response to a rotation of the toaster door 40.

Referring to FIGS. 3 and 4, connecting hole 76' located at the second end of the connecting lever 76 may be connected to door frame 45 at a connecting projection 46 having a predetermined width and extended from a lower portion at the side of door frame 45. Referring to FIG. 4, the connecting projection 46 may be provided as two semicircular arcs connected to each other in an "S"-type shape. Referring to FIG. 3, the connecting hole 76' may be provided as partially closed circle having a central angle of about 180 degrees or more.

In one aspect of the invention, the link mechanism further includes an elastic member 79 (e.g., spring, elastic material, etc.) arranged between the connecting lever 76 and the toaster case 50. The elastic member 79 couples the first end of the connecting lever 76 to a rear end of the toaster case 50.

Referring to FIGS. 3, 5A, 5B, 6A, and 6B, a first end of the elastic member 79 may be connected to the first end of the connecting lever 76 and a second end of the elastic member 79 is connected to the rear end of the toaster case 50. For example, the first end of the elastic member 79 may be coupled to spring hook 77 formed at the first end of the connecting lever 76, while the second end of the elastic member 79 may be coupled to a spring hook 53' formed at the rear of the rear case plate 53.

Accordingly, when the toaster door 40 is opened, the elastic member 79 may be extended between the spring hooks 77 and 53'. When the toaster door 40 is closed, the elastic member 79 exerts a restoring force on the first end of the connecting lever 76 so as to influence the toaster door 40 into a closed position.

Due to the presence of the link mechanism, tray 74 may be either inserted into or removed from the toaster case 50 upon closing or opening the toaster door 40, respectively. Accordingly, whenever toaster entrances 62 and 52 become opened or closed, a food item arranged on the tray 74 may also either be inserted into or removed from the toaster case 50.

According to the principles of the present invention, if the toaster door 40 is opened or closed, the toaster door 40 remains opened or closed until the user manipulates the toaster door 40 (e.g., rotates the toaster door past a predetermined threshold angle).

Figure 5A:
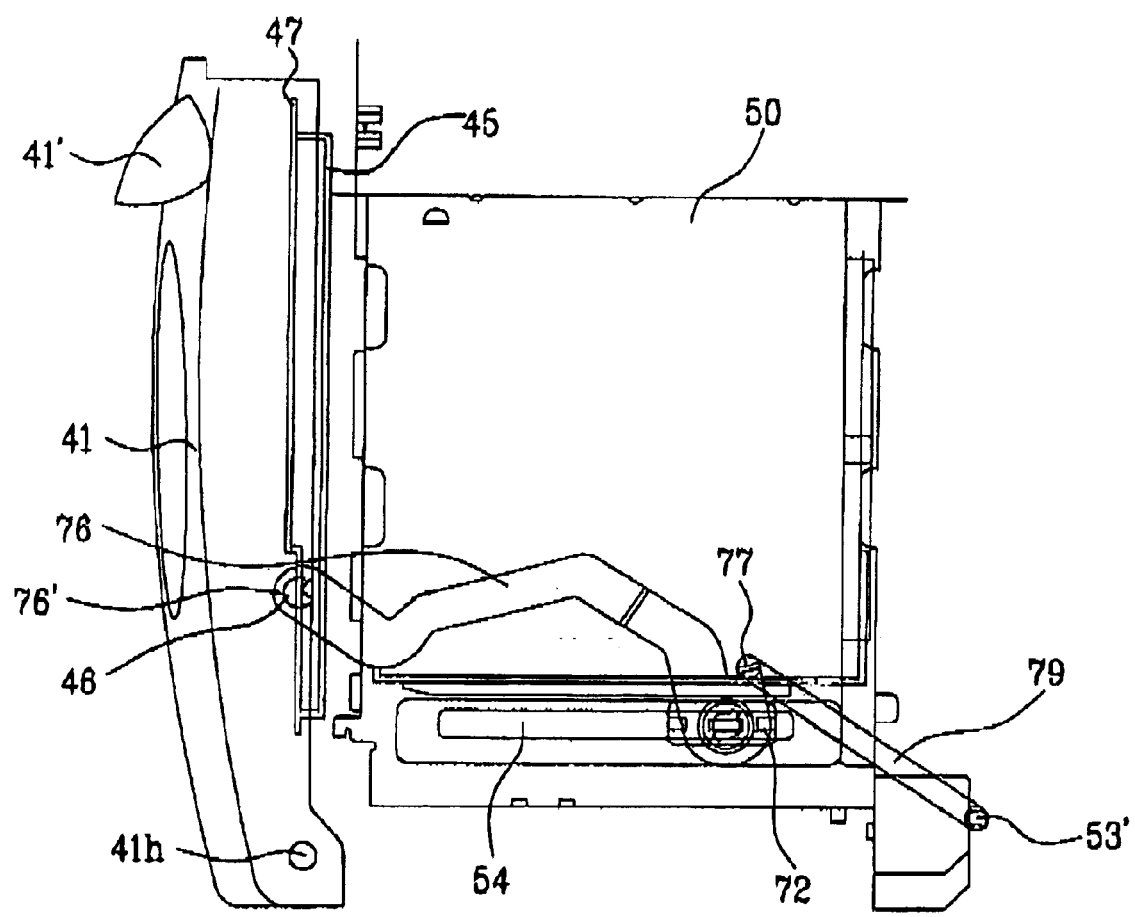
FIGS. 5A and 5B illustrate process steps of arranging a food item in the toaster shown in FIG. 2.
Figure 5B:
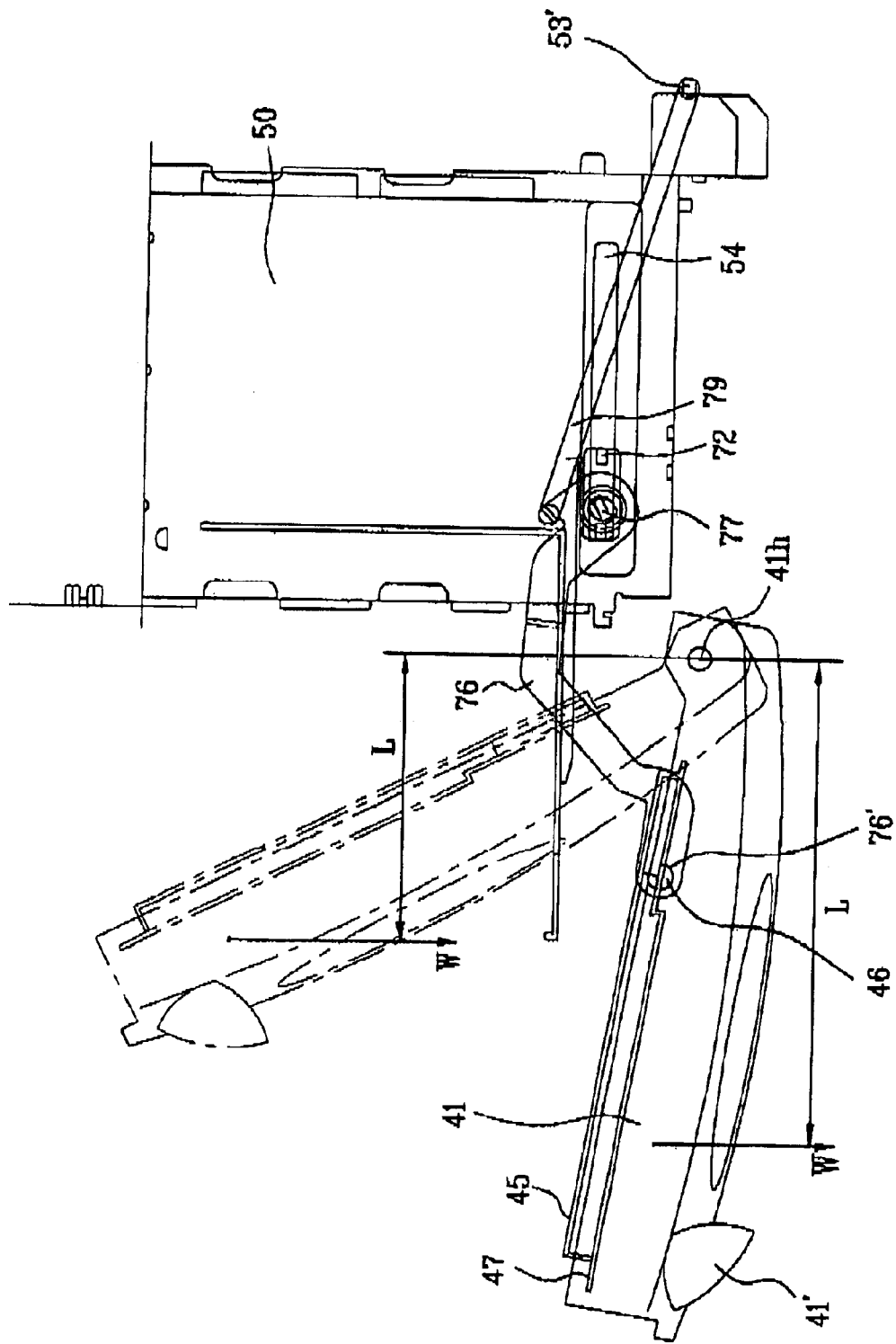
Figure 6A:
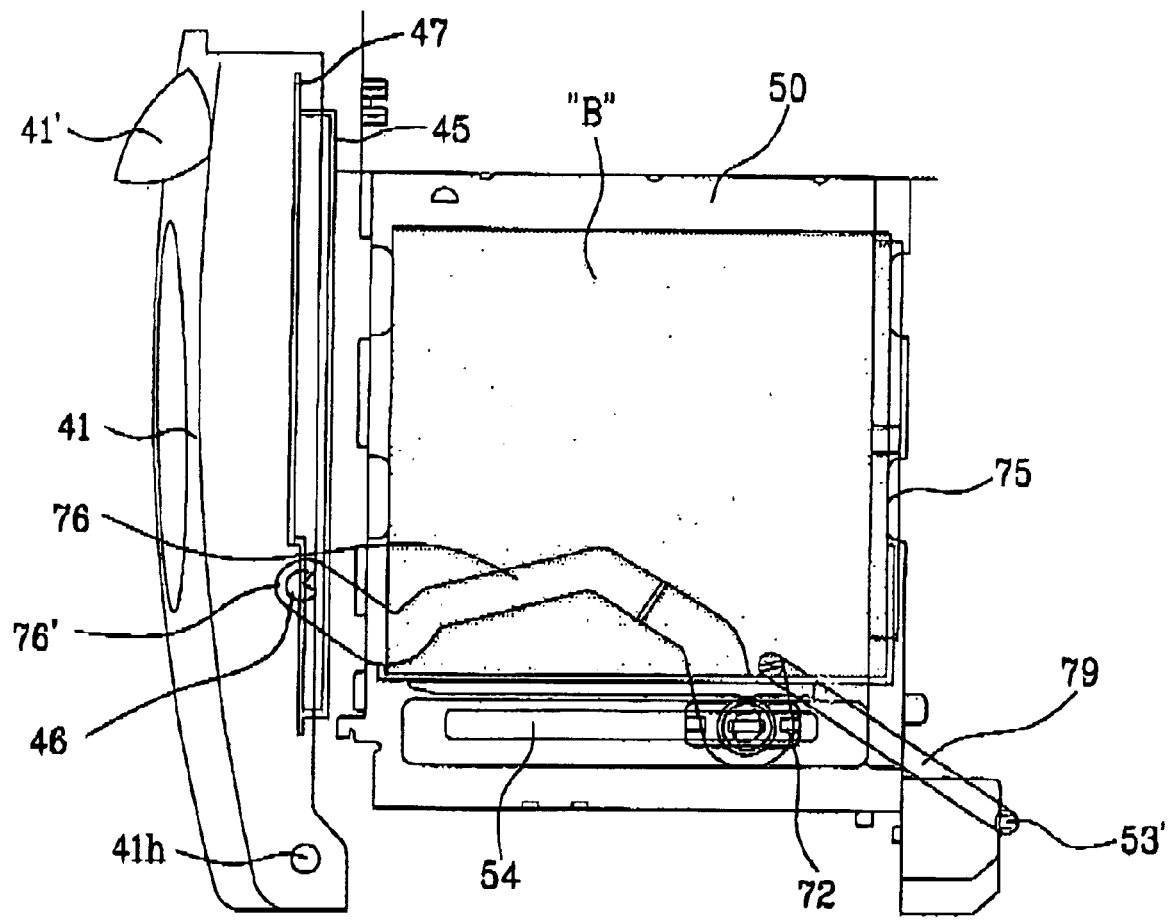
FIGS. 6A and 6B illustrate process steps of removing a food item from within the toaster shown in FIG. 2.

Referring to FIGS. 5B and 6A, for example, the center of gravity of the toaster door 40 may be located in the upper portion of the toaster door near the door handle 41'. A distance, L, from the center of gravity to the pivot line (an axis created by the hinge assembly about which the toaster door 40 rotates) is set as long as possible so that the rotational moment of the toaster door 40 is as large as possible. The rotational moment is the force acting on the toaster door 40 that maintains the door in an open position when the door is rotated past a predetermined threshold angle. Accordingly, the rotational moment may be calculated by multiplying the distance, L, by the toaster door weight, W, at a given angle the toaster door 40 is rotated to. To facilitate movement of the tray support 70, and to couple the motion of the tray 74 to the rotation of the toaster door 40, the second end of the connecting lever 76 may be positioned between the center of gravity and the pivot line of the toaster door 40. In one aspect of the present invention, the second end of the connecting lever 76 may be positioned from the pivot line to a height ⅓ the total height of the toaster door.

As shown in FIGS. 5B and 6A, distance, L, varies as the rotation angle of the toaster door 40 varies. Accordingly, for any weight, W, the rotational moment changes as the toaster door 40 is rotated.

When the toaster door 40 is completely closed, a restoring force induced by the elastic member 79 (possessing a predetermined coefficient of elasticity) acts on the toaster door 40 and maintains the toaster door 40 in a closed position. As the toaster door 40 is opened (as the rotation angle increases from 0 degrees), the distance, L, and therefore the rotational moment increases. While below the threshold rotation angle, the restoring force induced by the elastic member 79 is greater than the rotational moment. Accordingly, if left alone at a rotation angle less than the threshold angle, the toaster door 40 would be influenced by the elastic member and tend toward a closed position. As the toaster door 40 is rotated toward the threshold rotation angle (e.g., about 80 degrees), the rotational moment approaches the restoring force induced by the elastic member 79. As the toaster door 40 is rotated past the threshold rotation angle, the force of the rotational moment exceeds the restoring force of the elastic member 79. Accordingly, if left alone at a rotation angle greater than the threshold rotational angle, the toaster door 40 would be influenced by its own rotational moment and tend toward an open position.

The operation of the microwave oven incorporating a toaster according to the present invention will now be described in detail.

Referring to FIG. 5A, entrances 52 and 62 are initially closed by the toaster door 40. Even though the toaster door 40 is closed, the elastic member 79 exerts a restoring force on the connecting lever 76 greater than the rotational moment such that the toaster door 40 maintains contact with the toaster panel 32. Since the distance between the center of gravity of the toaster door 40 and the pivot line becomes zero at the closed position, the rotational moment of the toaster door 40 is negligible.

In order to open the toaster door 40, an external force greater than the restoring force of the elastic member 79 must be applied. If an unexpected external force is applied to the toaster door 40, the toaster door may still not be rotated past the threshold rotation angle. Accordingly, the toaster door 40 is immediately closed by the restoring force of the elastic member 79. If the user applies a force greater than the restoring force of the elastic member 79 to the handle 41', the toaster door 40 rotates about the hinge assembly provided at the bottom portion thereof past the threshold rotation angle, and assumes the opened position illustrated in FIG. 5B. At the same time, the connecting lever 76 is pulled by the toaster door 40, overcomes the restoring force provided by the elastic member 79, becomes projected out through the lever slots 51a and 64, and moves the bushing 72 along and within the moving slot 54 such that the bushing 72 moves the tray support 70 in a direction toward the front end of the toaster case 50.

Subsequently, one portion of the tray 74, secured to the tray support 70, projects out from the entrance 62 at a predetermined distance.

As mentioned above, as the toaster door 40 rotates towards an open position, away from a front end of the toaster, the rotational moment of the toaster door 40 approaches the restoring force induced by the elastic member 79. As the toaster door 40 approaches and surpasses the threshold rotation angle, the rotational moment becomes equal to and surpasses the restoring force induced by the elastic member 79. Accordingly, after the toaster door 40 has been rotated past the threshold rotation angle, a user may release the door and it will not close.

Figure 6B:
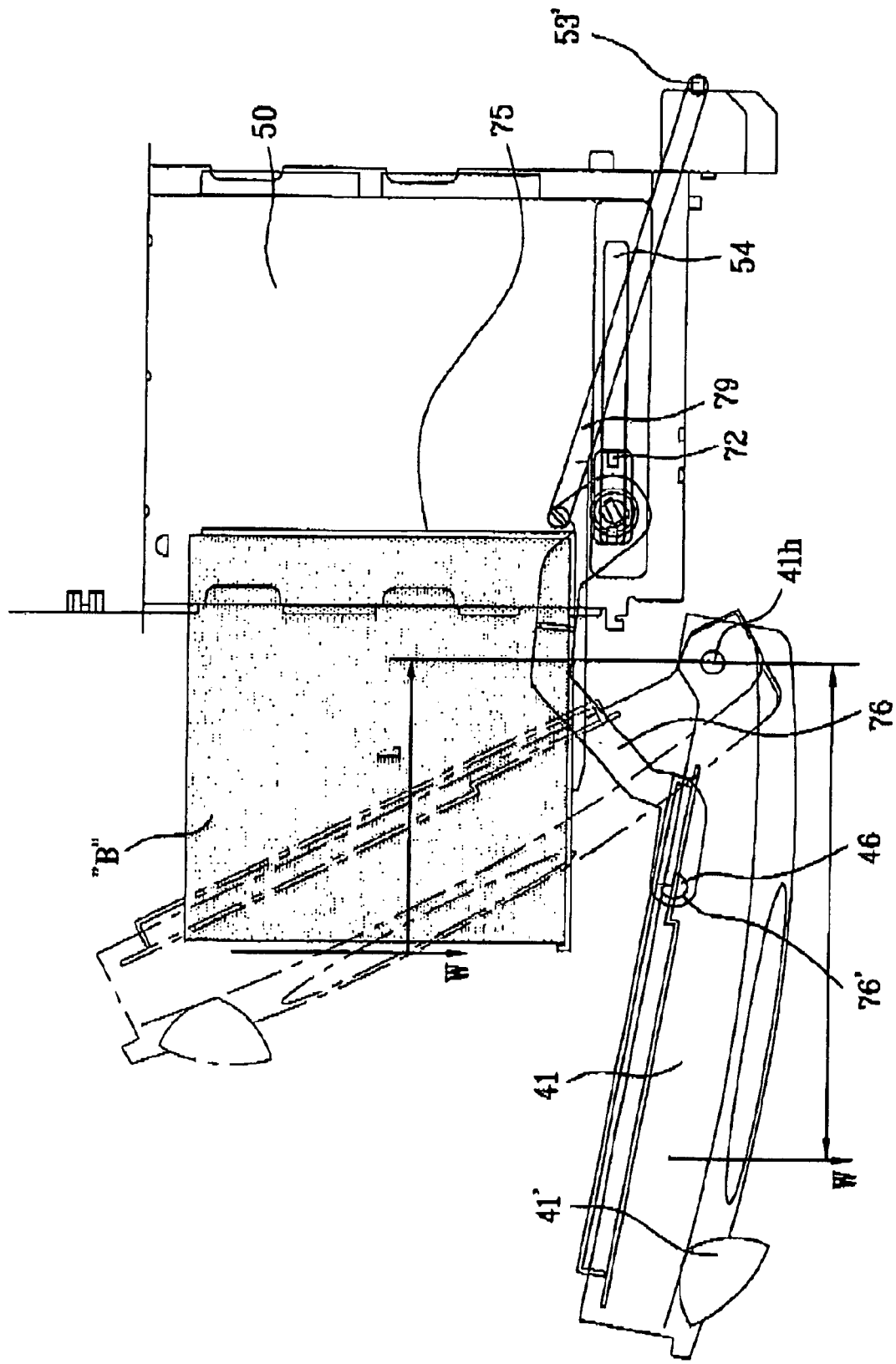

Referring now to FIG. 6A, when the toaster door 40 is arranged in a open position, a food item, B, may be arranged on the tray 74. Subsequently, as illustrated in FIG. 6B, the toaster door 40 may be rotated toward a closed position, toward the front end of the toaster door 40. It should be noted that it is not required that a user completely close the toaster door 40. For example, if the user rotates the toaster door 40 toward the closed position past the threshold angle, restoring force induced by the elastic member 79 pulls the connecting lever 76 toward a rear of the toaster case 50. At the same time, the bushing 72 moves toward the back of the moving slot 54 and the tray support 70 moves into the toaster case 50. As the tray support 70 moves into the toaster case 50, tray 74 is simultaneously inserted into the toaster case 50 and between heaters 80. Subsequently, heaters 80 may be activated to generate heat suitable for toasting a food item arranged on tray 74.

In generating heat suitable for toasting the food item, the generated heat flows through the toaster entrance 62 in the toaster front 60 to the frame surface 45' arranged at the rear of the toaster door 40. Since the edge 47 of the door frame is covered by the door protector 48, the generated heat does not flow through the edge 47 to the door panel 41. Therefore, heat generated inside the toaster 30 may be prevented from flowing to door panel 41. Accordingly, heat may be prevented from flowing to the door panel 41, door panel 41 does not deform due to heat and a user may be prevented from getting burnt.

In one aspect of the present invention, since the second end of connecting lever 76 is coupled to the connecting projection 46 of the door frame 45, any heat conducted by the connecting lever 76 is prevented from being transmitted to the door panel 41. If, for example, the connecting projection 46 were formed in the door panel 41, it would melt due to heat conducted by the connecting lever 76.

If the user pulls the door handle 41' after, for example, toasting of the food item is complete, the toaster door 40 rotates about the abovementioned axis and becomes opened as shown in FIG. 6A. At the same time, a portion of the tray 74 projects out from the toaster entrance 62 of the toaster front 60 to a predetermined distance. Accordingly, a food item, B, arranged on the tray 74 is removed from the toaster case 50 according to the rotation of the toaster door 40, thereby allowing a user to easily remove the food item from the toaster without being burned.

Still referring to FIGS. 5A–6B, flange 75 supports the backside of the food item, B. In one aspect of the present invention, flange 75 may be pulled on to push the food item out from inside the toaster case 50 if the food item were to get stuck at the case entrance 52 of the case front plate 51. For example, food item B may get stuck at the case entrance 52 if, for example, it were to lean slightly on the tray 74.

A method for fabricating the toaster door 40 according to the present invention will now be explained with reference to FIG. 4.

Referring to FIG. 4, the door panel 41 is placed such that the back of the door panel 41 is facing upward. Next, door frame 45 is positioned on the supports 42 such that cut away part 47' is arranged at hook 42' and inserting guide 43 is covered by edge 47. The door frame 45 may then be moved in a direction toward hinge pin 41h thereby inserting one end of the cut-away part 47' into the hook 42' and exposing inserting guide 43.

While the first end of the connecting lever 76 is connected to the bushing 72 provided in the toaster case 50, the second of the connecting lever 76 projects through the lever slots 64, 51a, and 49 of the toaster front 60, case front plate 51, and door protector 48, and then is secured to connecting projection 46.

The door protector 48 may be inserted between the door frame 45 and an inside wall provided at the rear of the door panel 41 corresponding to the upper edge 47 of the door frame 45. The door protector 48 is fixed by securing the projections 44 to respective ones of the grooves 48. The step portions 48j of the door protector 48 (shown in FIG. 3) may be fastened to the inserting guide 43. By securing the projections 44 to the grooves 48, edge 47 is effectively pressed to the door protector 48 and the door frame 45 is thereby secured within the toaster door 40.

In one aspect of the present invention, the door panel 41 may be coupled to the toaster panel 32 via the hinge assembly prior to coupling the door protector 48 to the door frame 45. In another aspect of the present invention, the door panel 41 may be coupled to the toaster panel 32 prior to, or after, the connecting lever 76 is coupled to the door frame 45.

The microwave oven incorporating a toaster according to the present invention has the following advantages.

The microwave oven incorporating a toaster facilitates the insertion and removal of a food item into and out of the toaster case 50. For example, the tray 74 may be inserted into or removed from the interior of the toaster case 50 according to the open and closed position of the toaster door 40. The flange 75 supports the backside of a food item and may push a food item out from the inside of the toaster case.

According to the principles of the present invention, no additional locking devices are required to maintain the toaster door 40 in a closed or open position once. For example, once the toaster door 40 is arranged in a closed position, the toaster door remains closed due to the restoring force induced by the elastic member. Additionally, once the toaster door 40 is rotated past a threshold rotational angle and thereby arranged in an open position, the toaster door 40 remains opened due to the force of the rotational moment induced by the weight of the toaster door 40. Lastly, once the toaster door is rotated to the threshold rotational angle from the open position, the toaster door automatically closes, thereby increasing the users convenience in operating the toaster.

According to the principles of the present invention, heat is prevented from flowing the inside of the toaster to the toaster panel 41 due to the presence of the door protector 48 and the door frame 45. Accordingly, it is possible to prevent the toaster door 40 from being thermally damaged and to prevent the user from being burned by heat generated within the toaster while the toaster door 40 is closed. Since the connecting lever 76 is made out of metal, durability of the toaster is improved.

Furthermore, no extra tools are required in securing the door frame 45 and door protector 48 to the door panel 41, thereby simplifying fabrication process steps.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A microwave oven incorporating a toaster comprising:
   a microwave cavity;
   a toaster arranged adjacent said microwave cavity, said toaster comprising: at least one first opening; and a toaster door for selectively exposing or concealing said at least one first opening, said toaster door comprising an insulating structure, said insulating structure comprising:
a door panel forming an exterior of the toaster door;
a door frame formed of metal and provided at a rear of the door panel; and
a door protector provided at the rear of the door panel for blocking heat from flowing from the door frame to the door panel.

2. The microwave oven incorporating a toaster as claimed in claim 1, further comprising at least one support provided at the rear of said door panel, said at least one support being projected from said rear of the door panel to a predetermined distance.

3. The microwave oven incorporating a toaster as claimed in claim 1, further comprising at least one guide provided at the rear of said door panel, said guide maintaining a predetermined distance between the door protector and the rear of the door panel.

4. The microwave oven incorporating a toaster as claimed in claim 3, further comprising a step portion arranged at an upper portion of the door protector, wherein said step portion engages said guide in maintaining said predetermined distance.

5. The microwave oven incorporating a toaster as claimed in claim 1, wherein said door frame includes a frame surface, wherein said frame surface contacts said at least one first opening when said at least one first opening is concealed by said toaster door.

6. The microwave oven incorporating a toaster as claimed in claim 5, wherein said door frame includes a frame edge extended around the perimeter of said frame surface, wherein said frame edge directly contacts said door protector.

7. The microwave oven incorporating a toaster according to claim 6, wherein said frame surface projects from said frame edge a predetermined distance.

8. The microwave oven incorporating a toaster as claimed in claim 6, further comprising:
at least one hook arranged on the rear of the door panel; and
a cut-away part arranged within said frame edge, said cut-away part being receivable by said at least one hook.

9. The microwave oven incorporating a toaster as claimed in claims 1, further comprising a hole arranged within said door protector, wherein a portion of said door frame contacts said at least one first opening through said hole.

10. The microwave oven incorporating a toaster as claimed in claim 1, further comprising:
at least one groove provided at a side surface of said door protector; and
at least one projection provided on a side surface at a rear of the door panel, said at least one projection being insertable into respective ones of said at least one groove.

11. The microwave oven incorporating a toaster as claimed in claim 1, further comprising:
at least one tray for supporting a food item; and
a link mechanism coupled between said toaster door and said at least one tray.

12. The microwave oven incorporating a toaster as claimed in claim 11, wherein said at least one tray is arranged within said toaster case when said at least one first opening is concealed, and wherein, via said link mechanism, a portion of said at least one tray projects from said toaster through said at least one first entrance when said at least one first entrance is exposed.

13. The microwave oven incorporating a toaster as claimed in claim 12, wherein the food item arranged vertically on said at least one tray.

14. The microwave oven incorporating a toaster as claimed in claim 11, further comprising a toaster door axis arranged at a bottom of the toaster door, wherein said toaster door rotates about said toaster door axis during said selectively exposing or concealing said at least one first opening.

15. The microwave oven incorporating a toaster as claimed in claim 11, wherein the center of gravity of said toaster door is arranged in an upper portion of the toaster door.

16. The microwave oven incorporating a toaster as claimed in claim 11, further comprising a flange provided at a rear of said at least one tray, said flange being capable of supporting said food item.

17. The microwave oven incorporating a toaster as claimed in claim 16, wherein said link mechanism includes at least one elastic member for connecting the connecting lever to a non-moveable portion of said toaster.

18. The microwave oven incorporating a toaster as claimed in claim 17, wherein said at least one elastic member connects said first end to a rear end of the toaster.

19. The microwave oven incorporating a toaster as claimed in claim 17, further comprising a threshold rotational angle, wherein a rotational moment of the toaster door is greater than a restoring force of said at least one elastic member if the toaster door rotates past said threshold rotational angle.

20. The microwave oven incorporating a toaster as claimed in claim 19, wherein said threshold rotational angle is approximately 80 degrees from the front of the toaster.

21. The microwave oven incorporating a toaster as claimed in claim 11, wherein said link mechanism comprises:
a tray support secured to said at least one tray for reciprocating within said toaster; and
a connecting lever connecting said toaster door to said tray support.

22. The microwave oven incorporating a toaster as claimed in claim 21, further comprising a toaster case arranged within said toaster.

23. The microwave oven incorporating a toaster as claimed in claim 22, further comprising moving slots arranged within sidewalls of said toaster case, wherein said tray support moves along an orientation of said moving slots.

24. The microwave oven incorporating a toaster as claimed in claim 23, wherein said moving slots extend along a bottom portion of the sidewalls.

25. The microwave oven incorporating a toaster as claimed in claim 23, further comprising at least one bushing coupled to the tray support, said at least one busing being insertable into said moving slots.

26. The microwave oven incorporating a toaster as claimed in claim 25, wherein said connecting lever includes a first end rotatably coupled to said bushing, and a second end rotatably coupled to said toaster door.

27. The microwave oven incorporating a toaster as claimed in claim 26, wherein said second end is positioned between the center of gravity of the toaster door and a pivot line about which the toaster door rotates.

28. The microwave oven incorporating a toaster as claimed in claim 26, wherein the second end of the connecting lever is positioned from said pivot line to a height about $\frac{1}{3}$ the total height of the toaster door.

* * * * *